(12) United States Patent
Sacks et al.

(10) Patent No.: US 8,917,823 B1
(45) Date of Patent: Dec. 23, 2014

(54) TRANSCRIBING AND NAVIGATING A RESPONSE SYSTEM

(75) Inventors: Joshua J. Sacks, San Carlos, CA (US);
Michele Covell, Palo Alto, CA (US);
Michael Chu, Los Altos Hills, CA (US);
Rohan Seth, San Francisco, CA (US);
Shumeet Baluja, Leesburg, VA (US);
David Marwood, San Francisco, CA (US)

(73) Assignee: Google Inc., Mountain View, CA (US)

( * ) Notice: Subject to any disclaimer, the term of this patent is extended or adjusted under 35 U.S.C. 154(b) by 589 days.

(21) Appl. No.: 13/116,852

(22) Filed: May 26, 2011

(51) Int. Cl.
*H04M 1/64* (2006.01)
(52) U.S. Cl.
USPC ........................................ 379/67.1; 379/88.22
(58) Field of Classification Search
USPC ................ 379/67.1, 68, 265.09, 88.22, 88.17
See application file for complete search history.

(56) References Cited

U.S. PATENT DOCUMENTS

| | | | |
|---|---|---|---|
| 6,456,619 B1 * | 9/2002 | Sassin et al. ................... | 370/356 |
| 8,199,888 B2 | 6/2012 | Chang et al. | |
| 8,238,526 B1 | 8/2012 | Seth et al. | |
| 8,238,669 B2 | 8/2012 | Covell et al. | |
| 8,352,489 B1 | 1/2013 | Covell | |
| 8,392,427 B1 | 3/2013 | Ioffe et al. | |
| 8,411,977 B1 | 4/2013 | Baluja et al. | |
| 8,423,359 B2 | 4/2013 | Cohen et al. | |
| 8,442,125 B2 | 5/2013 | Covell et al. | |
| 8,479,225 B2 | 7/2013 | Covell et al. | |
| 2008/0260114 A1 | 10/2008 | Siminoff | |
| 2009/0086941 A1 * | 4/2009 | Altberg et al. ............ | 379/114.01 |
| 2010/0150325 A1 * | 6/2010 | Mulligan et al. ........... | 379/93.01 |
| 2011/0026692 A1 * | 2/2011 | Sharp ......................... | 379/88.23 |

* cited by examiner

*Primary Examiner* — Simon King
(74) *Attorney, Agent, or Firm* — Bracewell & Giuliani LLP

(57) ABSTRACT

Methods, systems, and apparatus, including computer programs encoded on a computer-readable storage medium for transcribing information. A method includes: identifying a telephone number that once dialed has an associated message that is played or includes a response system; transcribing the message or information about the response system; storing the transcribed message or information in association with the telephone number in database; receiving a request from a user that includes the telephone number; and providing information about the transcribed information to the user.

19 Claims, 7 Drawing Sheets

(12) United States Patent

US 8,917,823 B1

TRANSCRIBING AND NAVIGATING A RESPONSE SYSTEM

BACKGROUND

This specification relates to information presentation.

A telephone number can be associated, for example, with a business entity. A telephone number may be identified, such as by using a directory of business entities. A business entity may, for example, have an associated voicemail system or an associated response system that is accessed when the associated telephone number is dialed. The calling party can be connected to an information source (e.g., in the form of a recorded message) or a response system. Examples of response systems include touch-tone response systems and interactive voice response systems. After being connected to a response system, a user can listen to played messages or navigate the response system to retrieve information. When using some response systems, a user can select an option to talk to a live operator associated with the business entity.

SUMMARY

In general, one innovative aspect of the subject matter described in this specification can be implemented in methods that include a method for transcribing information. The method comprises: identifying a telephone number that once dialed has an associated message that is played or includes a response system; transcribing the message or information about the response system; storing the transcribed message or information in association with the telephone number in database; receiving a request from a user that includes the telephone number; and providing information about the transcribed information to the user.

These and other implementations can each optionally include one or more of the following features. The telephone number can have an associated voicemail greeting message that is played and transcribing can include transcribing the voicemail greeting message. The response system can be a touch-tone response system and transcribing the information about the response system can include transcribing the decision tree available via touchtone. The response system can be a voice response system. Transcribing the information about the response system can include transcribing options or a decision tree that is presented to a caller. Receiving the request that includes the number can include receiving the request from a dialer as the number is dialed and providing the information about the transcribed information can include providing the transcribed information to a user interface on a client device associated with the dialer. Providing the information about the transcribed information can include providing the transcribed information over the Internet. Providing the information about the transcribed information can include providing the transcribed information in response to a call from an application running on a client device. The application can be a client application that receives the transcribed information from a server. Providing the information about the transcribed information can include providing the user a notification of the availability of the transcribed information. Providing the information about the transcribed information can include providing the transcribed information. The method can further comprise providing the user with the transcribed information, receiving a selection from the user based on the transcribed information and providing to the response system an input based on the selection in order to navigate through the response system. The method can further comprise presenting the user with ads based on the selection. Providing the user with information can include providing the user with a link to the transcribed information. The link can be a link to a business entity associated with the telephone number. Providing the user with information can includes providing ads to the user. Providing the user with ads can include providing the user with ads that relate to a business associated with the telephone number.

In general, another aspect of the subject matter described in this specification can be implemented in systems that include a system for transcribing information. The system comprises: a transcribing system and a response system. The transcribing system can dial a telephone number associated with the response system, transcribe information about the response system, and store the transcribed information in association with the telephone number in a database. The response system can receive a request from a user that includes the telephone number and can provide information about the transcribed information to the user.

Particular implementations may realize one or more of the following advantages. A user can be presented with the full transcribed text from a voicemail greeting, with particular, important information highlighted, without the user having to wait to listen to the entire voicemail greeting. A user can be presented with a full decision tree for an interactive voice response system without the user having to fully navigate the entire interactive voice response system. A user can be presented content relative to selections made while navigating an interactive voice response system. Particular features of an interactive voice response system, such as an option for exiting the system or for talking to a live operator, can be presented to the user without the user having to discover such features by navigating the interactive voice response system.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Systems, methods and apparatus are provided for transcribing content that is associated with a dialed telephone number. An entity may, for example, have an associated voicemail system or an associated response system that is accessed when the associated telephone number is dialed. A message associated with a voicemail system or information about a response system may be transcribed and may be stored in a database, in association with the telephone number.

Subsequently, a request from a user that includes the telephone number may be received. For example, the user may perform a web search using the telephone number or the user may dial the telephone number. In response to the request, information about the transcribed information (or the transcribed information itself) may be provided to the user. For example, the full text of a transcribed voicemail greeting or particular items of information parsed from the voicemail greeting may be provided to the user, enabling the user access to such information without having to listen to the entire voicemail greeting. As another example, a representation of a decision tree associated with a response system may be displayed, allowing a user to see all of the options available using the response system and to select a particular option.

For situations in which the systems discussed here collect personal information about users, the users may be provided with an opportunity to opt in/out of programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained (such as to a city, zip code, or state level), so that a particular location of the user cannot be determined.

Figure 1:
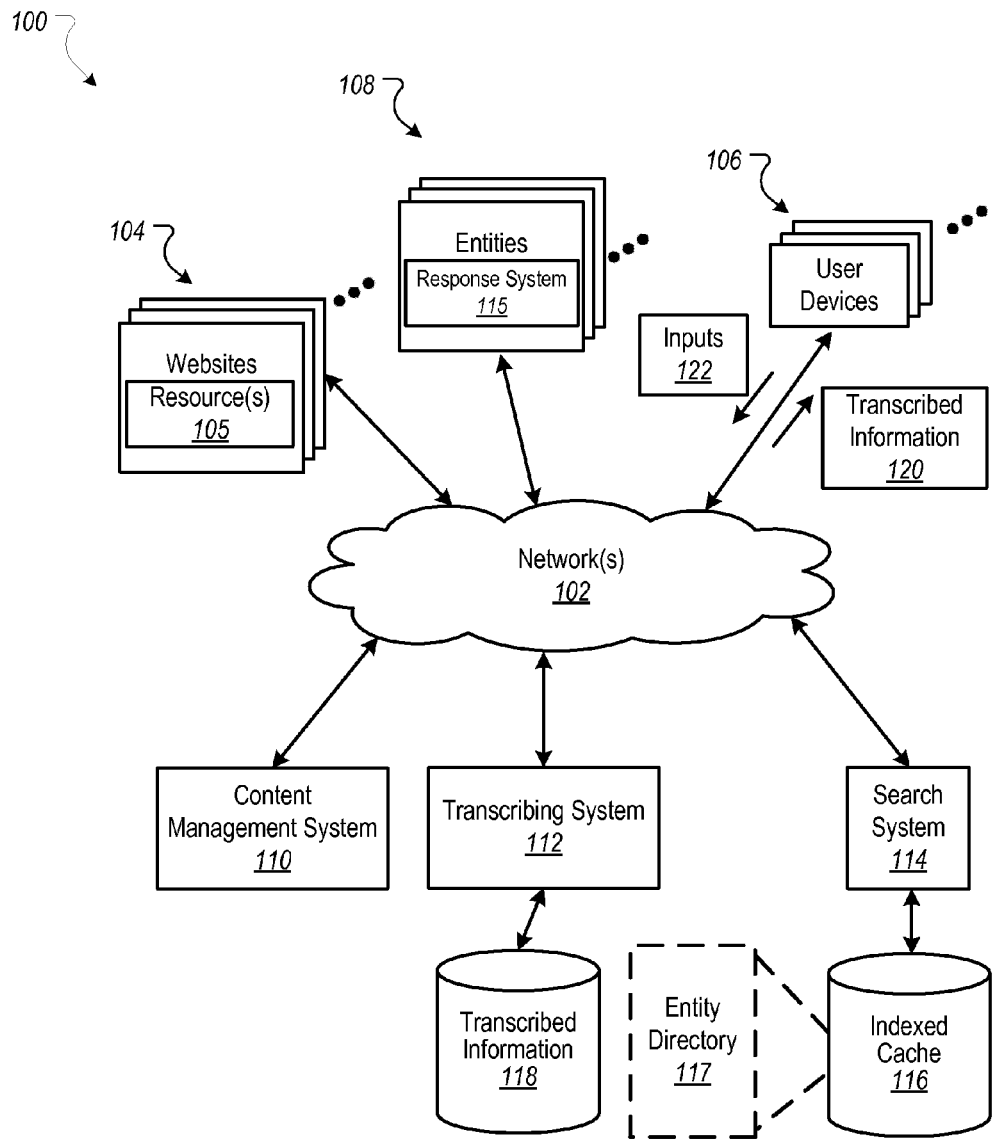
FIG. 1 is a block diagram of an environment for providing transcribed information.

FIG. 1 is a block diagram of an example environment 100 for providing transcribed information. The example environment 100 includes one or more networks 102, such as a local area network (LAN), a wide area network (WAN), the Internet, one or more telecommunications networks, or a combination thereof. The networks 102 connect websites 104, user devices 106, entities 108, a content management system 110, a transcribing system 112, and a search system 114. The example environment 100 may include many thousands of user devices 106, websites 104, and entities 108.

A website 104 includes one or more resources 105 associated with a domain name and hosted by one or more servers. An example website is a collection of web pages formatted in hypertext markup language (HTML) that can contain text, images, multimedia content, and programming elements, such as scripts. Each website 104 can be maintained by a content publisher, which is an entity that controls, manages and/or owns the website 104. The content publisher may be an entity 108 or some other entity.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources 105 can include content, such as words, phrases, images and sounds, that may include embedded information (such as meta-information in hyperlinks) and/or embedded instructions (such as JavaScript scripts).

A user device 106 is an electronic device that is under control of a user and is capable of requesting and receiving resources over the networks 102. Example user devices 106 include personal computers, mobile communication devices (e.g., smartphones), and other devices that can send and receive data over the network 102. A user device 106 typically includes one or more user applications, such as a web browser, to facilitate the sending and receiving of data over the networks 102. Some user devices 106, such as mobile communication devices, are capable of placing a telephone call.

An entity 108 may be, for example, a business, such as a store, restaurant, or company. An entity 108 has an associated telephone number. Dialing the associated telephone number may connect the dialer to a response system 115 of the entity 108. The response system 115 may be, for example, a touchtone response system or a voice-response system. For some entities 108, dialing the associated phone number may connect the dialer to a voicemail system that does not include a response system.

The transcribing system 112 may identity a set of entities 108 and telephone numbers associated with the set of entities 108. For example, the transcribing system 112 may identify a set of entities 108 using the search system 114. The transcribing system 112 may perform a search for entities 108 using the search system 114. For example, the search system 114 may match search terms for entities 108 and associated telephone numbers to data stored in an indexed cache 116. Data in the indexed cache 116 may be indexed based on a resource 105 to which the data corresponds. The indexed and, optionally, cached copies of the resources 105 can be stored in an indexed cache 116. The indexed cache 116, or another data store, may include an entity directory 117, where the entity directory 117 includes information about entities 108, including associated telephone numbers.

The transcribing system 112 may, for each identified entity 108, programmatically dial the telephone number associated with the entity 108. If the entity 108 has a response system 115, the response system 115 may answer the call. If the entity 108 has a voicemail system, then a voicemail system may answer the call and a voicemail greeting may be played. The transcribing system 112 may record the audio of the call. The transcribing system 112 may programmatically dial telephone numbers for the identified entities 108 in a batch that is configured to run overnight, so as to increase a likelihood of a voicemail or response system 115 answering rather than a human answering, as compared to dialing the telephone numbers during daytime hours.

If the audio is a voicemail greeting, the transcribing system 112 may transcribe, or generate text corresponding to the audio, such as using a speech to text engine. The transcribed message may be stored in a transcribed information database 118, in association with the entity 108 (e.g., in association with the telephone number of the entity 108). The transcribing system 112 may parse the transcribed message and may identify information in the transcribed message, such as information about open hours, the entity location, holiday closings, or specials or offers, to name a few examples. The identified information may be stored in the transcribed information database 118, in association with the entity 108.

If the entity 108 includes a response system 115, the transcribing system 112 may transcribe information about a decision tree that is available via, for example, touchtone or voice response. For example, the transcribing system 112 may navigate the entire response system 115 using a structured approach, such as a depth first approach. The transcribing system 112 may, for example, navigate the decision tree by generating and sending touch-tones, or by sending audio (e.g., voice) commands.

The audio commands may be sent, for example, based on the audio recorded from the response system 115. For example, the transcribing system 112 may send portions of the recorded audio that correspond to available audio commands. For example, the audio recorded from the voice response system 115 may include a phrase "you can say 'billing', 'technical support', or 'new service'". The transcribing system 112 may convert the audio to text, may parse the text, may identify the available voice commands (e.g., "billing", "technical support", "new service"), may identify portions of the audio that include the identified commands (e.g., identify a portion of audio that includes "billing"), and may navigate the decision tree by sending a portion of the audio as a voice command to the response system 115. As another example, the transcribing system 112 may, after converting the audio to text, generate audio, such as using a text to speech engine, for words that have been identified as voice commands, and may send the generated audio as voice commands to the response system 115, to navigate the decision tree.

A representation of the decision tree may be stored in the transcribed information database 118, in association with the entity 108. The transcribing system 112 may, when processing a voicemail greeting or a decision tree, identify other options, such as an option to speak to a live operator, or an option to exit the voicemail or response system 115. The transcribing system 112 may, when navigating the response system 115, record information about timing of responses (e.g., how long to wait between the issuing of multiple touch-tone or voice responses sent to the response system 115).

After transcribed information has been stored for a telephone number, a user device 106 may send a request that includes the telephone number. For example, the request may be a request to obtain information about the entity 108 associated with the telephone number. The request may be sent, for example, to the transcribing system 112 or to the search system 114. If the request is sent to the search system 114, the search system 114 may identify data and resources relevant to the entity 108 in the indexed cache 116 and/or in the entity directory 117. The search system 114 may forward the request to the transcribing system 112 and the transcribing system 112 may identify transcribed information about the entity 108, such as information about hours, etc., and the transcribing system 114 may forward the identified transcribed information to the search system 114, and the search system 114 may include the transcribed information, for example, in search results that are returned to the user device 106 (e.g., as transcribed information 120).

As another example, a user device 106 that is capable of placing a telephone call may dial a telephone number associated with an entity 108. The transcribing system 112 may receive a notification that the user device 106 is dialing the telephone number, and the transcribing system 112 may connect to the entity 108 on behalf of the user device 106. The transcribing system 112 may access transcribed information associated with the telephone number from the transcribed information database 118.

The transcribing system 112 may provide the transcribed information to a user interface on the user device 106 (e.g., as transcribed information 120). For example, full text of a voicemail greeting may be displayed on the user device 106, allowing the user of the user device 106 to see the full greeting without having to wait to listen to the full greeting. Information extracted from the transcribed voicemail greeting, such as information about hours or location, may be displayed (e.g., displayed prominently) on the user interface of the user device 106. Rather than display the voicemail greeting or information extracted from the voicemail greeting, a notification that transcribed information is available may be displayed. For example, a link to transcribed information may be displayed.

If the transcribed information includes information for a decision tree, information about the decision tree may be displayed on the user device 106. For example, a representation of the decision tree may be displayed, a link to decision tree information may be displayed, or some other notification that decision tree information is available may be displayed. A decision tree representation may display options available for navigation of the response system 115 on the user device 106, allowing the user to discover and explore such options without having to directly navigate the response system 115.

The user may select a node in the decision tree representation, indicating that the user desires to invoke an option in the decision tree corresponding to the selected node. The node may be, for example, several levels deep in the decision tree. The user selection may be sent to the transcribing system 112 (e.g., as an input 122). The transcribing system 112 may receive the input 122 and may send a corresponding input or set of inputs to the response system 115. For example, the transcribing system 112 may send a touch-tone, a set of touch-tones, a voice command, or a set of voice commands. If multiple inputs are sent, the transcribing system 112 may pause between sending inputs, based on timing information stored in the transcribed information database 118.

One or more content items (e.g., ads) may be displayed on the user device 106, such as based on the entity 108 associated with a requested telephone number, or based on a user selection of a particular node in a decision tree representation. The transcribing system 112 may send a request for one or more content items to the content management system 110. The content management system 110 can receive a request for content items to be provided. The request can include characteristics of content slots that are defined for a destination. For example, a size of the slot, and/or media types that are available for presentation in the slot can be provided to the content management system 110. Similarly, one or more keywords, such as a keyword associated with an entity 108 or with a user selection, can also be provided to the content management system 110 to facilitate identification of relevant items. Based on data included in the request for content, the content management system 110 can select content items that are eligible to be provided in response to the request.

Figure 2:
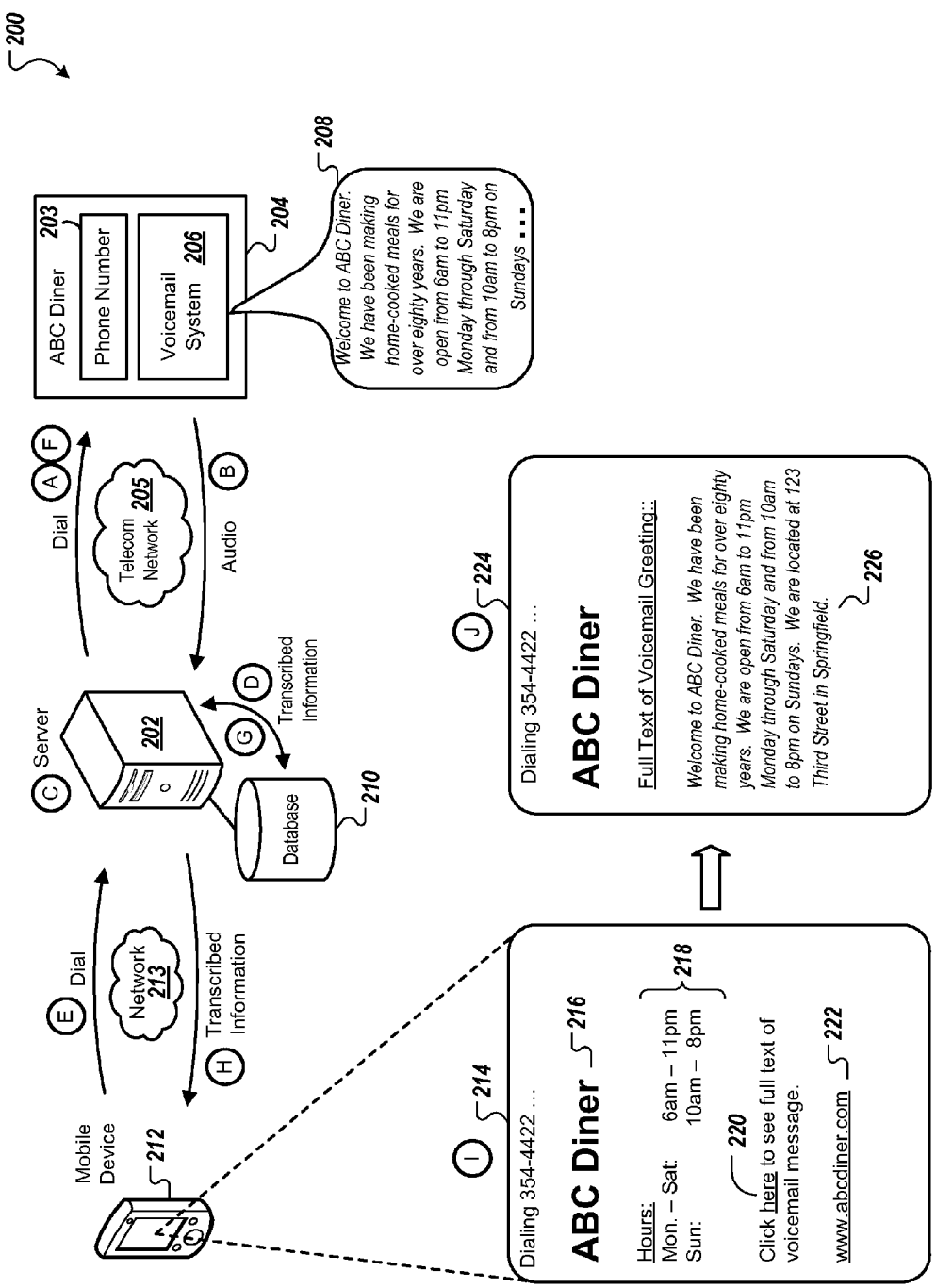
FIGS. 2 and 3 are block diagrams of example systems for providing transcribed information.

FIG. 2 is a block diagram of an example system 200 for providing transcribed information. In a state "A", a server 202 dials a telephone number 203 associated with an "ABC Diner" entity 204. The server 202 may be included in, for example, the transcribing system 112 described above with respect to FIG. 1. The entity 204 may be an example of the entity 108 described above with respect to FIG. 1. The server 202 may communicate with the entity 204, for example, over a telecommunication network 205. The "ABC Diner" entity 204 includes a voicemail system 206, that when dialed, plays a voicemail greeting 208. The voicemail greeting 208 includes, for example, information describing when the "ABC Diner" is open.

In a state "B", the server 202 records the voicemail greeting 208 and stores the voicemail greeting 208 in a database 210. In a state "C", the server 202 transcribes the voicemail greeting. The server 202 may parse the transcribed greeting, to identify information, such as information about hours, location, or other information about the "ABC Diner" entity 204. In a state "D", the server 202 stores the transcribed greeting and the identified information in the database 210, in association with the telephone number 203.

In a state "E", a user of a device 212 dials the telephone number 203 associated with the "ABC Diner" entity 204. The dialing of the telephone number 203 may be received, for example, by the server 202 over a network 213. The server 202 may, in turn, in a state "F", dial the telephone number 203 using the telecommunication network 205, on behalf of the device 212. Audio received from the voicemail system 206 may be forwarded to, presented and/or played on the device 212, or otherwise communicated to the device 212. In a state "G", the server 202 accesses transcribed information associated with the telephone number 203 from the database 210.

In a state "H", the server 202 provides the device 212 with the transcribed information. The transcribed information may be provided to the device 212 in parallel with the playing of the voicemail greeting 208 on the device 212. For example, the transcribed information may be provided to a user interface of a calling application included in the device 212. For example, in a state "I", a user interface 214 is displayed on the device 212. The user interface 214 includes a name 216 of the entity 204, hours information 218 previously extracted from the voicemail greeting 208, a link 220 allowing the user to view the full text of the voicemail greeting 208, and a link 222 to a website associated with the entity 204.

Displaying the hours information 218, or other information extracted from the voicemail greeting 208, may allow the user to obtain desired information without having to listen to the entire voicemail greeting 208. In a state "J", in response to user selection of the link 220, a user interface 224 is displayed on the device 212. The user interface 224 includes text 226 of the voicemail greeting 208. Some voicemail greetings may be relatively lengthy in duration, such as thirty seconds, one minute, or more. The user may be able to read the text 226 or may be able to locate desired information in the text 226 faster than the time required to listen to the entire voicemail greeting 208.

Figure 3:
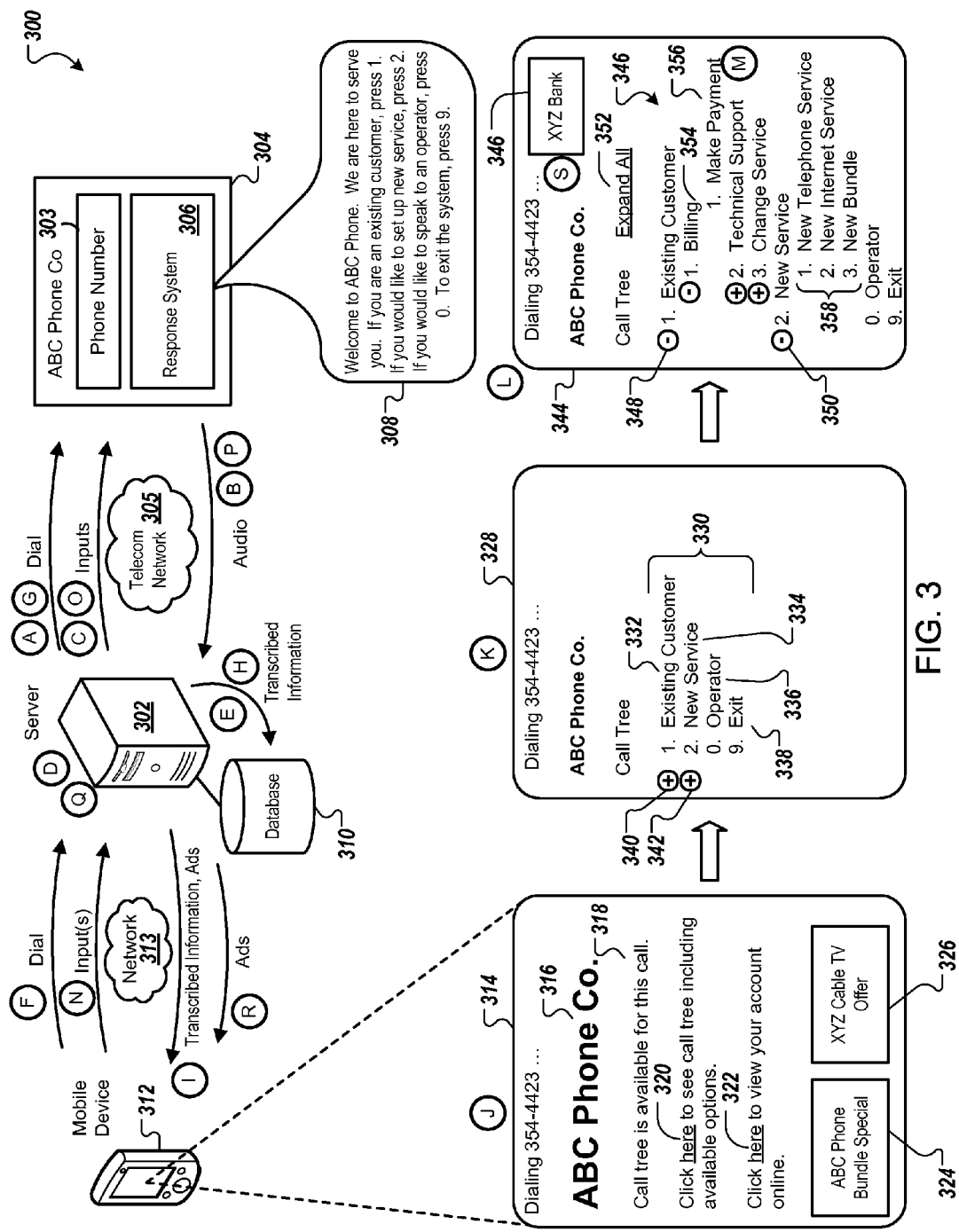

FIG. 3 is a block diagram of an example system 300 for providing transcribed information. In a state "A", a server 302 dials a telephone number 303 associated with an "ABC Phone Company" entity 304. The server 302 may be included in, for example, the transcribing system 112 described above with respect to FIG. 1. The entity 304 may be an example of the entity 108 described above with respect to FIG. 1. The server 302 may communicate with the entity 304, for example, over a telecommunication network 305.

The "ABC Phone Company" entity 304 includes a response system 306 (e.g., interactive voice response (IVR) system, touch-tone response system), that when dialed, plays an initial greeting 308. The initial greeting 308 is an entry point for a decision tree that may be used to navigate the response system 306. The decision tree includes, for example, initial options for existing customers, for setting up new service, for speaking with an operator, or for exiting the system. Selecting one of the initial options may result in presentation of other options. The decision tree for the response system 306 may include many options and many levels of options.

In a state "B", the server 302 records the initial greeting 308 and stores the initial greeting 308 in a database 310. The initial greeting may be used, for example, as an audio fingerprint. Fingerprinting is described in more detail below. In a state "C", the server 302 transcribes a decision tree available from the response system 306 via touch-tone, voice or other response. For example, the server 302 may navigate the response system 306, such as systematically, such as using a depth-first traversal, where the server 302 selects each available option. The server 302 may, for example systematically issue multiple touch-tone and/or voice commands to the response system 306. In a state "D", the server 302 records information about each available option, to build a decision tree representation of the response system 306. In a state "E", the decision tree representation is stored in a database 310, in association with the telephone number 303.

In a state "F", a user of a mobile device 312 dials the telephone number 303 associated with the "ABC Phone" entity 304. The dialing of the telephone number 303 may be received, for example, by the server 302, over a network 313. The server 302 may, in turn, in a state "G", dial the telephone number 303 using the telecommunication network 305, on behalf of the mobile device 312. Audio received from the response system 306 may be forwarded to and played/presented on the mobile device 312, or otherwise communicated to the mobile device 312. In a state "H", the server 302 accesses transcribed information associated with the telephone number 303 from the database 310. The transcribed information may include information regarding a decision tree for navigating the response system 306. While reference is made above to the coincident retrieval of the transcribed information with a dialed call, such is not required. For example, a user can provide the telephone number for an entity to the system and be provided the transcribed information without necessitating a call be placed. For example, the transcribed information may include relevant information about the entity's location (i.e., brick and mortar store location), hours of operation or the like. Retrieval of the transcribed information may be sufficient for the user's purposes without necessitating a call be placed to the entity.

In a state "I", the server 302 provides the mobile device 312 with the transcribed information. The transcribed information may be provided to the mobile device in parallel with the playing of the audio received from the response system 306 on the mobile device 312. For example, the transcribed information may be provided to a user interface of a calling application included in the mobile device 312. For example, in a state "J", a user interface 314 is displayed on the mobile device 312. The user interface 314 includes a name 316 of the entity 304 and a notification 318 that decision tree (e.g., call tree) information is available for the call.

The user may be presented with an option to review the transcribed information (e.g., the user can select a link 320 to see a decision tree representation corresponding to the decision tree information). In the example shown, the user may select a link 322 to view a website associated with the entity 304. In some implementations, ads 324 and 326 may be displayed. Ads may be received, for example, from the server 302 in the state "I". The ad 324 can be an ad associated with the entity 304. The ad 326 can be an ad for a different company. The ad 326 may be selected, for example, based on the business type of the entity 304. For example, ads for businesses that may complement the entity 304 may be selected.

In a state "K", in response to user selection of the link 320, a user interface 328 is displayed on the mobile device 312. The user interface 328 includes a decision tree representation 330. The decision tree representation 330 lists each available option along with a corresponding command that will enable the option. For example, issuing commands "one", "two", "zero", or "nine" (e.g., spoken or by pressing a respective touchtone) may invoke an "existing customer" option 332, a "new service" option 334, a "speak to operator" option 336, or an "exit system" option 338, respectively.

If an option enables subsequent options, an indicator, such as an indicator 340 or an indicator 342, may be displayed next to the respective option. A user may select the indicator 340 or 342 to show details and associated sub-options corresponding to the selected option. For example, the user may select the indicator 340 to expand the "existing customer" option 332 to display sub-options associated with the "existing customer" option 332. As another example, the user may select the indicator 342 to expand the "new service" option 334 to display sub-options associated with the "new service" option 334.

For example, in a state "L", and as illustrated in a user interface 344, an updated decision tree 346 may be displayed in response to user selection of the indicators 340 and 342. The indicators 340 and 342 may change in appearance after being selected (e.g., as illustrated by corresponding respective indicators 348 and 350). The user may select other indicators to expand and expose other options. As another example, a user may select a link 352 to expand all options. For example, a "billing" option 354 and a "make payment" option 356 may be exposed underneath the "existing customer" option 332 and multiple options 358 may be exposed underneath the "new service" option 334.

In a state "M", the user selects the "make payment" option 356. In a state "N", an indication of the user selection of the option 356 is sent to the server 302. In a state "O", the server 302 sends one or more inputs (e.g., touch-tones, voice commands) to the response system 306, where the one or more inputs correspond to the user selection of the option 356. For example, the server 302 may send a first touch-tone of the digit "1" (e.g., corresponding to the option 332), may send a second touch-tone of the digit "1", after a pause (e.g., corresponding to the option 354, and may send a third touch-tone of the digit "1", after a pause (e.g., corresponding to the option 356).

In a state "P", the response system 306 responds to the inputs from the server 302 and plays audio corresponding to the option 356. The server 302, in a state "Q", and in response to user selection of the option 356, may select one or more ads based on the option 356. The ads may be selected, for example, using an ads server (not shown). The ads may be sent to the mobile device 312, in a state "R". In a state "S", the ads are displayed on the mobile device 312. For example, an ad 346 for a bank, which was selected based on a relevance of a keyword "financial" corresponding to the selected option 356, may be displayed on the user interface 344.

Although processing for certain states above is described as being performed by the server 302, some or all of the processing for such states can be performed by another component, such as by the response system 306. For example, the response system 306 can provide audio and transcribed information to the user device 312. Similarly, although processing for certain states above is described as being performed by the response system 306, some or all of the processing for such states can be performed by another component, such as the server 302.

Figure 4:
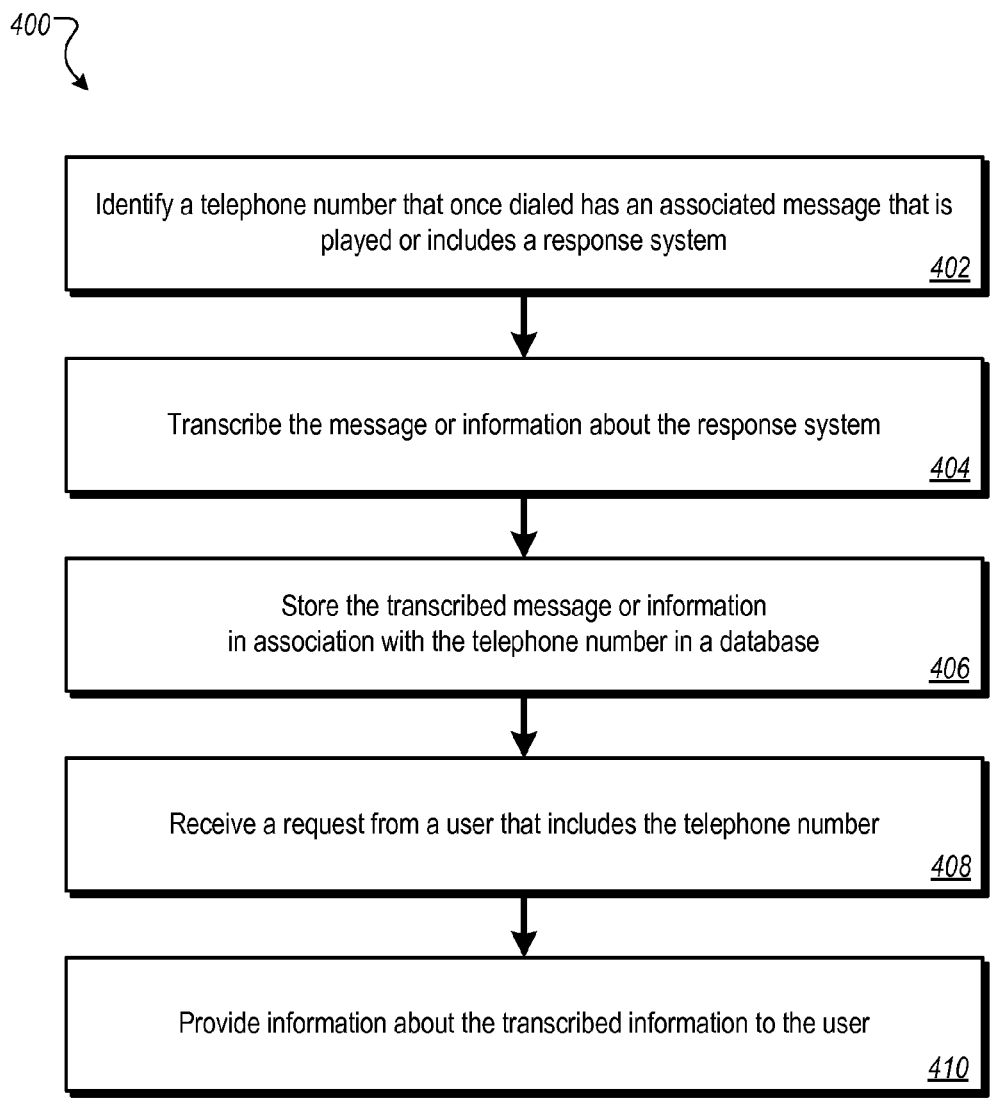
FIG. 4 is a flowchart of an example process for transcribing information.

FIG. 4 is a flowchart of an example process 400 for transcribing information. The process 400 can be performed, for example, by the transcribing system 112 described above with respect to FIG. 1. A telephone number is identified that once dialed has an associated message that is played or includes a response system (402). The transcribing system 112 may, for example, identify the telephone number by crawling for telephone numbers on the Internet or by looking up the telephone number, for example, in a business directory (e.g., "yellow pages").

The telephone number may, for example, be associated with a voicemail system and the voicemail system may have an associated voicemail greeting. As another example, the telephone number may be associated with an IVR system or a touch-tone response system.

Figure 5:
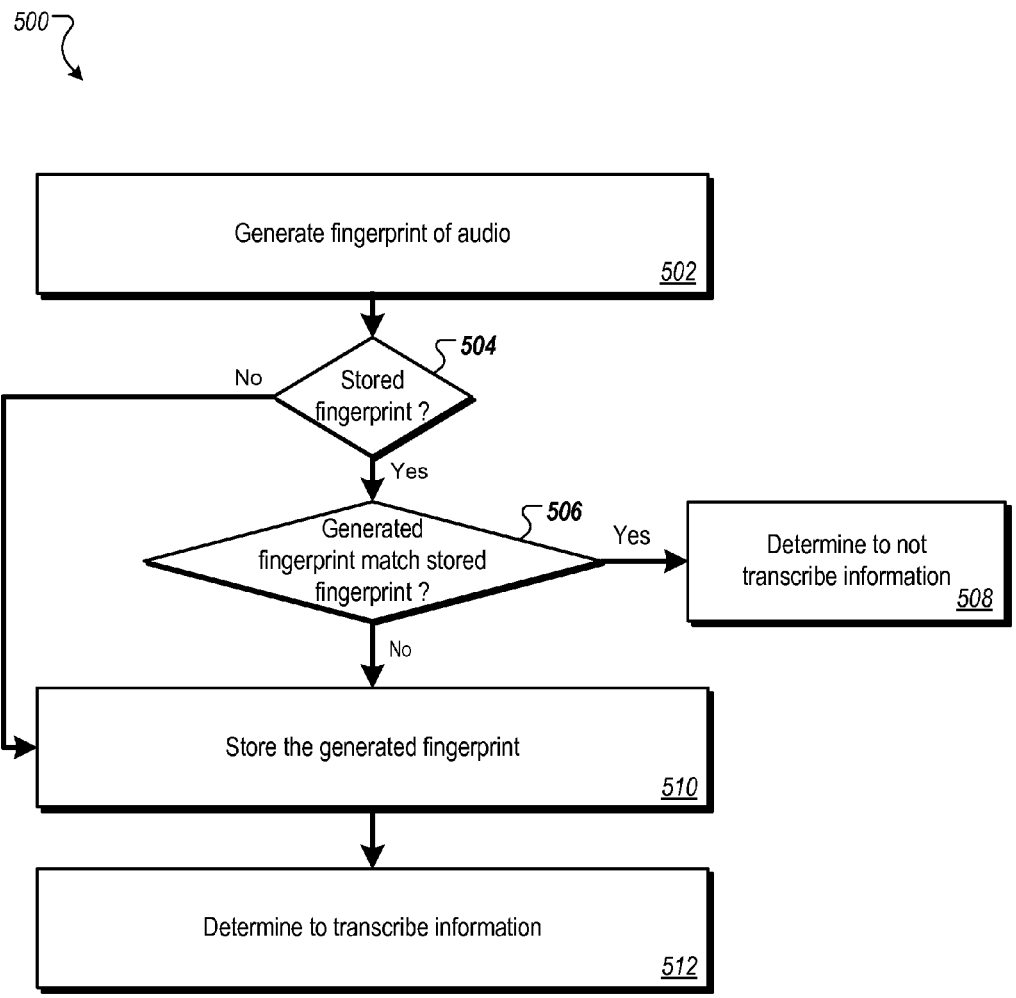
FIG. 5 is a flowchart of an example process for determining whether to transcribe information.

The message or information about the response system is transcribed (404). In some implementations, before information is transcribed, a determination process is performed to determine whether to transcribe information. Information might not be transcribed, if, for example, it is determined that information has already been transcribed for the telephone number. For example, FIG. 5 is a flowchart of an example process 500 for determining whether to transcribe information. The process 500 can be performed, for example, by the transcribing system 112 described above with respect to FIG. 1. A fingerprint of the audio of a telephone call to a telephone number is generated (502). For example, if the telephone number is associated with a voicemail system, a fingerprint of the voicemail greeting may be generated. As another example, if the telephone number is associated with a response system, a fingerprint may be generated for audio corresponding to an initial set of options available using the response system.

It is determined whether a stored fingerprint associated with the telephone number exists (504). For example, it may be determined whether a fingerprint associated with the telephone number is stored in a database.

If a stored fingerprint associated with the telephone number exists, it is determined whether the generated fingerprint matches the stored fingerprint (506). For example, the stored fingerprint may be accessed from the database and may be compared to the generated fingerprint. If the generated fingerprint matches the stored fingerprint, it is determined to not transcribe information for the telephone number (508). For example, it may be determined that information has already been transcribed for the telephone number and it may be determined to not repeat transcribing information for the telephone number, such as to avoid unnecessary processing.

If the generated fingerprint does not match the stored fingerprint (e.g., 506), or if a stored fingerprint associated with the telephone number does not exist (e.g., 504), the generated fingerprint is stored (510). A stored fingerprint may not exist, for example, if information has never been transcribed for the telephone number. The generated fingerprint might not match the stored fingerprint, if, for example, a voicemail message or a response system has changed since information was last transcribed. The generated fingerprint may be stored, for example, in a database, in association with the telephone number.

It is determined to transcribe information from audio of the telephone call (512). For example, it may be determined to transcribe information for the telephone number for the first time, or it may be determined to transcribe information for the telephone number in response to detecting that a voicemail message or a response system has changed since information was last transcribed.

Returning to FIG. 4, if it is determined to transcribe information, and if the telephone number is associated with a voicemail system, the associated voicemail greeting may be transcribed. Text corresponding to the voicemail greeting may be generated, such as by using a speech to text engine. The transcribed message may be parsed to identify particular types of information, such as information about open hours, a location, holiday closings, specials or offers, etc.

If the telephone number is associated with a response system, information about a decision tree that is available via touchtone, voice or other response may be transcribed. For example, the response system may be systematically navigated, such as by using a depth-first approach or a breadth-first approach. The decision tree may be navigated, for example, by generating and send touch-tones, or by generating or identifying and sending audio commands.

The audio commands may be sent, for example, based on audio recorded from the response system. For example, portions of the recorded audio that correspond to available commands may be sent to the response system. The audio may be converted to text, the text may be parsed to identify available voice commands, portions of the audio that include the identified voice commands may be identified, and the decision tree may be navigated by sending a portion of the audio as a voice command, to the response system. As another example, the audio may be converted to text, words that are identified as voice commands may be converted to audio, such as using a text to speech engine, and generated audio may be sent to the response system as voice commands to navigate the response system.

As the response system is navigated, the structure and the options available from the response system may be recorded in a representation of the decision tree. The presence of particular options, such as an option to speak to a live operator, or an option to exit the system, may be identified as being available in the response system and may be recorded in the decision tree representation. The decision tree representation may include information about timing of responses (e.g., how long to wait between the issuing of multiple touch-tone or voice responses sent to the response system).

The transcribed message or information is stored in association with the telephone number in a database (406). For example, if the telephone number is associated with a voicemail system, the transcribed message and identified information may be stored in a database, in association with the telephone number. As another example, if the telephone number is associated with a response system, the representation of the decision tree may be stored in a database, in association with the telephone number.

A request is received from a user that includes the telephone number (408). For example, the user may issue a search request, such as using a directory or a search engine, for information related to the telephone number or related to an entity associated with the telephone number. As another example, a request from a dialer to dial the telephone number may be received as the telephone number is dialed. The dialer may be, for example, associated with a client device, such as a mobile device.

Information about the transcribed information is provided to the user (410). For example, the transcribed information or information about the transcribed information may be provided to a client device, for example by the transcribing system 112 or by the response system 115. For example, if the request is a search request received from a client for information related to the telephone number and if the telephone number is associated with a voicemail system, information identified when transcribing a voicemail greeting may be presented to the user, such as in search results displayed on the client device. For example, if a user searches for information relating to a telephone number of a business, or searches for information relating to the business, information identified from the transcribed message that indicates the hours that the business is open on particular days of the week may be displayed in search results, such as in combination with other information that a search engine finds relating to the telephone number or to the business.

As another example, if the request is received from a dialer as the telephone number is dialed, and if the telephone number is associated with a voicemail system, the transcribed message or a link to the transcribed message may be displayed on a dialing device (e.g., a mobile device). For example, the transcribed information may be provided to a user interface on a mobile device associated with the dialer, in response to a call from an application running on the mobile device.

As yet another example, if the request is received from a dialer as the telephone number is dialed, and if the telephone number is associated with a response system, then a representation of a decision tree or a link to the representation of the decision tree may be displayed on a user interface of the dialing device (e.g., mobile device). The user may be able to interact with the representation of the decision tree, such as to expand hierarchical options to see options that are available at various levels of the hierarchy. In some implementations, one level of a decision tree is exposed to the user at a time, possibly synchronized to the playing of corresponding audio received from the response system. In some implementations, the entire decision tree is displayed to the user. In some implementations, audio played by the response system is not played on the dialing device.

In some implementations, the user may be provided with a notification of the availability of the transcribed information. For example, a link to the transcribed information may be provided. In some implementations, a link to the transcribed information and partial transcribed information are initially provided to the user. In some implementations, if all of the transcribed information is displayable and viewable (e.g., without scrolling) on a single user interface in a font size greater than a threshold font size, then all of the transcribed information is displayed on the user interface, whereas if not all of the transcribed information is displayable then a link to the transcribed information is displayed. In some implementations, as much of the transcribed information as possible is displayed on the user interface and a link may be displayed allowing the user to view the remainder of the transcribed information if not all of the transcribed information fits on the user interface.

In some implementations, a link to a business entity associated with the telephone number is provided. As another example, a link to a particular function offered by a website associated with the business entity may be provided to the user, such as a function that may be performed either using the website or using the response system. A link to reviews, or to other available information related to the entity may be provided. Ads may be provided to the user. For example, ads that relate to a business associated with the telephone number may be provided. As another example, ads relating to a category of a business entity associated with the telephone number or to a category relating to the category of the business entity may be provided.

Figure 6:
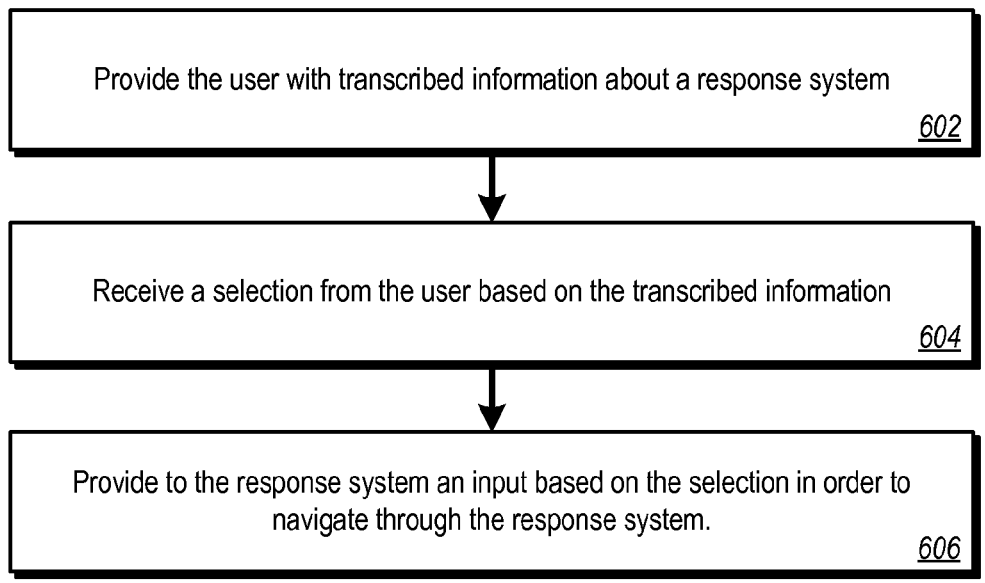
FIG. 6 is a flowchart of an example process for processing interactions with transcribed information.

FIG. 6 is a flowchart of an example process 600 for processing interactions with transcribed information. The process 600 can be performed, for example, by the transcribing system 112 described above with respect to FIG. 1.

A user is provided with transcribed information about a response system (602). For example, as described above, the user may be provided with a representation of a decision tree that corresponds to options offered by the response system.

A selection is received from the user based on the transcribed information (604). For example, the user may select a node in a decision tree representation, where the node represents a particular option at a particular level in the decision tree. As another example, if the response system offers an option to speak to a live operator or to exit the system, the user may select a control associated with the speak to a live operator option or the exit the system option. In some implementations, such controls may be displayed to the user for the entire time that the decision tree representation is displayed, regardless of the present navigation state of the decision tree representation.

An input is provided to the response system based on the selection in order to navigate through the response system (606). For example, one or more touch-tones and/or one or more voice responses may be provided to the response system, based on the selection. In some implementations, one input is provided to the response system for each user selection. For example, in some implementations, if a user selects a top (e.g., first) level node of a decision tree implementation, then an input corresponding to the selection, such as a touchtone, may be provided to the response system, and if the user selects a second level node of the decision tree, then a second input corresponding to the second selection may be provided to the response system, with the first input and the second input being sent at different times.

As another example, in some implementations, the decision tree representation allows the user to navigate to various levels of the decision tree and to select an option at any level of the decision tree. Inputs might be provided in response to the selection of an option but not in response to navigating the decision tree (e.g., a control or user interface command used to navigate the decision tree may be different than a control or command used to select a particular option). For example, if the user selects a particular option that is not a top level option, multiple inputs may be provided to the response system, at the same time, corresponding to a set of options that correspond to a navigation path leading to the selected option.

Figure 7:
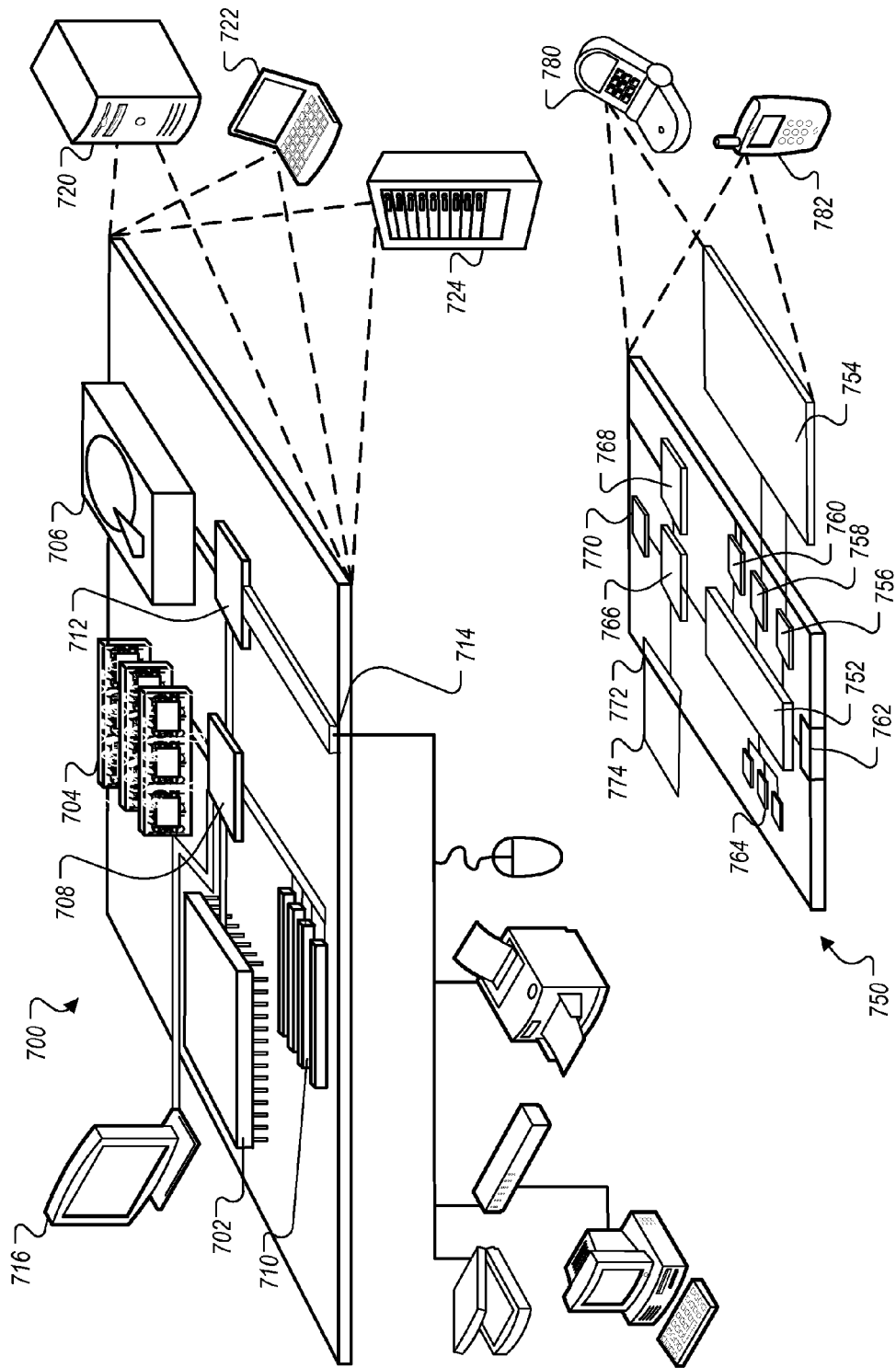
FIG. 7 is a block diagram of computing devices that may be used to implement the systems and methods described in this document, as either a client or as a server or plurality of servers.

FIG. 7 is a block diagram of computing devices 700, 750 that may be used to implement the systems and methods described in this document, as either a client or as a server or plurality of servers. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a computer-readable medium. In one implementation, the memory 704 is a volatile memory unit or units. In another implementation, the memory 704 is a non-volatile memory unit or units.

The storage device 706 is capable of providing mass storage for the computing device 700. In one implementation, the storage device 706 is a computer-readable medium. In various different implementations, the storage device 706 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 704, the storage device 706, or memory on processor 702.

The high speed controller 708 manages bandwidth-intensive operations for the computing device 700, while the low speed controller 712 manages lower bandwidth-intensive operations. Such allocation of duties is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can process instructions for execution within the computing device 750, including instructions stored in the memory 764. The processor may also include separate analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT LCD display or an OLED display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication (e.g., via a docking procedure) or for wireless communication (e.g., via Bluetooth or other such technologies).

The memory 764 stores information within the computing device 750. In one implementation, the memory 764 is a computer-readable medium. In one implementation, the memory 764 is a volatile memory unit or units. In another implementation, the memory 764 is a non-volatile memory unit or units. Expansion memory 774 may also be provided and connected to device 750 through expansion interface 772, which may include, for example, a SIMM card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, or memory on processor 752.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS receiver module 770 may provide additional wireless data to device 750, which may be used as appropriate by applications running on device 750.

Device 750 may also communication audibly using audio codec 760, which may receive spoken information from a user and convert it to usable digital information. Audio codex 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the payment systems and methods have been described, it should be recognized that numerous other applications are contemplated. Accordingly, other embodiments are within the scope of the following claims.

What is claimed is:

1. A method, where a transcribing system performs steps comprising:
dialing a telephone number associated with a response system;
transcribing information about the response system;

storing the transcribed information in association with the telephone number in database;

where the response system:

receives a request from a user that includes the telephone number; and provides information about the transcribed information to the user.

2. The method of claim 1 where the telephone number has an associated voicemail greeting message that is played and where transcribing includes transcribing the voicemail greeting message.

3. The method of claim 1 where the response system is a touch-tone response system and where transcribing the information about the response system includes transcribing a decision tree available via touchtone.

4. The method of claim 1 where the response system is a voice response system.

5. The method of claim 4 where transcribing the information about the response system includes transcribing options or a decision tree that is presented to a caller.

6. The method of claim 1 where receiving the request that includes the number includes receiving the request from a dialer as the number is dialed and where providing the information about the transcribed information includes providing the transcribed information to a user interface on a client device associated with the dialer.

7. The method of claim 1 where providing the information about the transcribed information includes providing the transcribed information over the Internet.

8. The method of claim 1 where providing the information about the transcribed information includes providing the transcribed information in response to a call from an application running on a client device.

9. The method of claim 8 where the application is a client application that receives the transcribed information from a server.

10. The method of claim 1 where providing the information about the transcribed information includes providing the user a notification of the availability of the transcribed information.

11. The method of claim 1 where providing the information about the transcribed information includes providing the transcribed information.

12. The method of claim 1 further comprising providing the user with the transcribed information, receiving a selection from the user based on the transcribed information and providing to the response system an input based on the selection in order to navigate through the response system.

13. The method of claim 12 further comprising presenting the user with ads based on the selection.

14. The method of claim 1 where providing the user with information includes providing the user with a link to the transcribed information.

15. The method of claim 14 where the link is a link to a business entity associated with the telephone number.

16. The method of claim 1 where providing the user with information includes providing ads to the user.

17. The method of claim 1 where providing the user with ads includes providing the user with ads that relate to a business associated with the telephone number.

18. A system comprising:

a transcribing system; and a response system;

where the transcribing system:

dials a telephone number associated with the response system;

transcribes information about the response system; and stores the transcribed information in association with the telephone number in a database; and where the response system:

receives a request from a user that includes the telephone number; and provides information about the transcribed information to the user.

19. A computer program product tangibly embodied in a computer-readable storage device and comprising instructions that, when executed by a processor of a transcribing system, cause the transcribing system to:

dial a telephone number associated with a response system;

transcribe information about the response system;

store the transcribed-information in association with the telephone number in database;

where the response system:

receives a request from a user that includes the telephone number; and provides information about the transcribed information to the user.

* * * * *